United States Patent
Wu et al.

(10) Patent No.: US 9,207,676 B2
(45) Date of Patent: Dec. 8, 2015

(54) SYSTEM AND METHOD FOR GUIDING AUTOMATED GUIDED VEHICLE

(71) Applicant: INDUSTRIAL TECHNOLOGY RESEARCH INSTITUTE, Hsinchu (TW)

(72) Inventors: Cheng-Hua Wu, Hsinchu (TW); Yu-Lun Ho, Hsinchu (TW); Yueh-Ju Pu, Toufen Township, Miaoli County (TW); Ching-Yi Kuo, Kaohsiung (TW); Jwu-Sheng Hu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 218 days.

(21) Appl. No.: 13/686,626

(22) Filed: Nov. 27, 2012

(65) Prior Publication Data

US 2013/0158773 A1 Jun. 20, 2013

(30) Foreign Application Priority Data

Dec. 15, 2011 (TW) .............................. 100146645 A (51) Int. Cl.
*G05D 1/00* (2006.01)
*G05D 1/02* (2006.01)

(52) U.S. Cl.
CPC ............ *G05D 1/0231* (2013.01); *G05D 1/0246* (2013.01); *G05D 1/0236* (2013.01); *G05D 1/0261* (2013.01); *G05D 2201/0216* (2013.01)

(58) Field of Classification Search
CPC ......... G01C 22/00; G06F 165/00; B62D 1/00
USPC ................................ 701/23, 25, 24; 318/587
See application file for complete search history.

(56) References Cited

U.S. PATENT DOCUMENTS 4,940,925 A * 7/1990 Wand et al. .................... 318/587
5,341,130 A   8/1994 Yardley et al.
(Continued)

FOREIGN PATENT DOCUMENTS

CA   2049773 A1   2/1993
CN   1228379 A    9/1999
(Continued)

OTHER PUBLICATIONS

TW Office Action dated Feb. 6, 2014.
English Abstract translation of JP4160413 (Published Jun. 3, 1992).
CN Office Action dated Dec. 3, 2014.
(Continued)

*Primary Examiner* — Tuan C. To
*Assistant Examiner* — Michael Fouche
(74) *Attorney, Agent, or Firm* — McClure, Qualey & Rodack, LLP (57) ABSTRACT

A system for guiding an automated guided vehicle (AGV) is provided. The system includes a guidance path, an AGV, an image capturing apparatus and an operation unit. The guidance path guides the AGV. The AGV moves on the guidance path and is guided by the guidance path. The AGV moves in a vision guidance region after departing from the guidance path. The image capturing apparatus captures a vision guidance region associated image. The vision guidance region associated image at least includes an image of the vision guidance region. The operation unit determines whether the AGV departs from the guidance path, and calculates position information of the AGV in the vision guidance region. When the AGV departs from the guidance path, the operation unit guides the AGV according to the vision guidance region associated image.

20 Claims, 5 Drawing Sheets

(56) References Cited

U.S. PATENT DOCUMENTS

| | | | |
|---|---|---|---|
| 5,794,166 A * | 8/1998 | Bauer et al. | 701/23 |
| 5,838,562 A * | 11/1998 | Gudat et al. | 701/23 |
| 5,911,767 A * | 6/1999 | Garibotto et al. | 701/28 |
| 6,049,745 A * | 4/2000 | Douglas et al. | 701/23 |
| 6,256,560 B1 * | 7/2001 | Kim et al. | 701/23 |
| 6,272,406 B2 | 8/2001 | Alofs et al. | |
| 2001/0001843 A1 * | 5/2001 | Alofs et al. | 701/24 |

FOREIGN PATENT DOCUMENTS

| | | |
|---|---|---|
| CN | 201194114 Y | 2/2009 |
| JP | 4160413 A | 6/1992 |

OTHER PUBLICATIONS

Full English (machine) translation of CN201194114 (Published Feb. 11, 2009).

\* cited by examiner

SYSTEM AND METHOD FOR GUIDING AUTOMATED GUIDED VEHICLE

This application claims the benefit of Taiwan application Serial No. 100146645, filed Dec. 15, 2011, the disclosure of which is incorporated by reference herein in its entirety.

BACKGROUND

1. Technical Field

The disclosure relates to system and method for guiding an automated guided vehicle (AGV).

2. Description of the Related Art

Accompanied with industrial automated production requirements, demands for automated guided vehicles (AGV) for transporting materials in factories have surged. A conventional AGV usually adopts a guidance path as a guiding system, and is programmed to move to different work stations along the guidance path. However, the guidance path is not easily modified and thus has a lower routing flexibility. Further, the operating stations have independent routes such that a directly transit is infeasible. An AGV operating based on a laser-guided mechanism is later developed. A laser AGV is positioned and navigated through reflector maps. However, such laser AGV is costly and its navigation system is prone to undesirable environmental effects.

SUMMARY

The disclosure is directed to a system and method for guiding an automated guide vehicle (AGV).

According to one embodiment, a system for guiding an AGV is provided. The system includes a guidance path, an AGV, an image capturing apparatus and an operation unit. The guidance path guides the AGV. The AGV is guided and moves on the guidance path. The AGV moves in a vision guidance region after departing from the guidance path. The image capturing apparatus captures a vision guidance region associated image. The captured image at least includes an image of the vision guidance region. The operation unit determines whether the AGV is departed from the guidance path, and calculates position information of the AGV in the vision guidance region. When the AGV is departed from the guidance path, the operation unit guides the AGV according to the vision guidance region associated image According to another embodiment, a method for guiding an AGV is provided. The AGV is guided and moves on a guidance path, and moves in a vision guidance region after departing from the guidance path. The method includes steps of: capturing a vision guidance region associated image at least including an image of the vision guidance region; determining whether the AGV is departed from the guidance path; guiding the AGV by the guidance path when the AGV is not departed from the railing system; and guiding the AGV according to the vision guidance region associated image when the AGV is departed from the guidance path.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
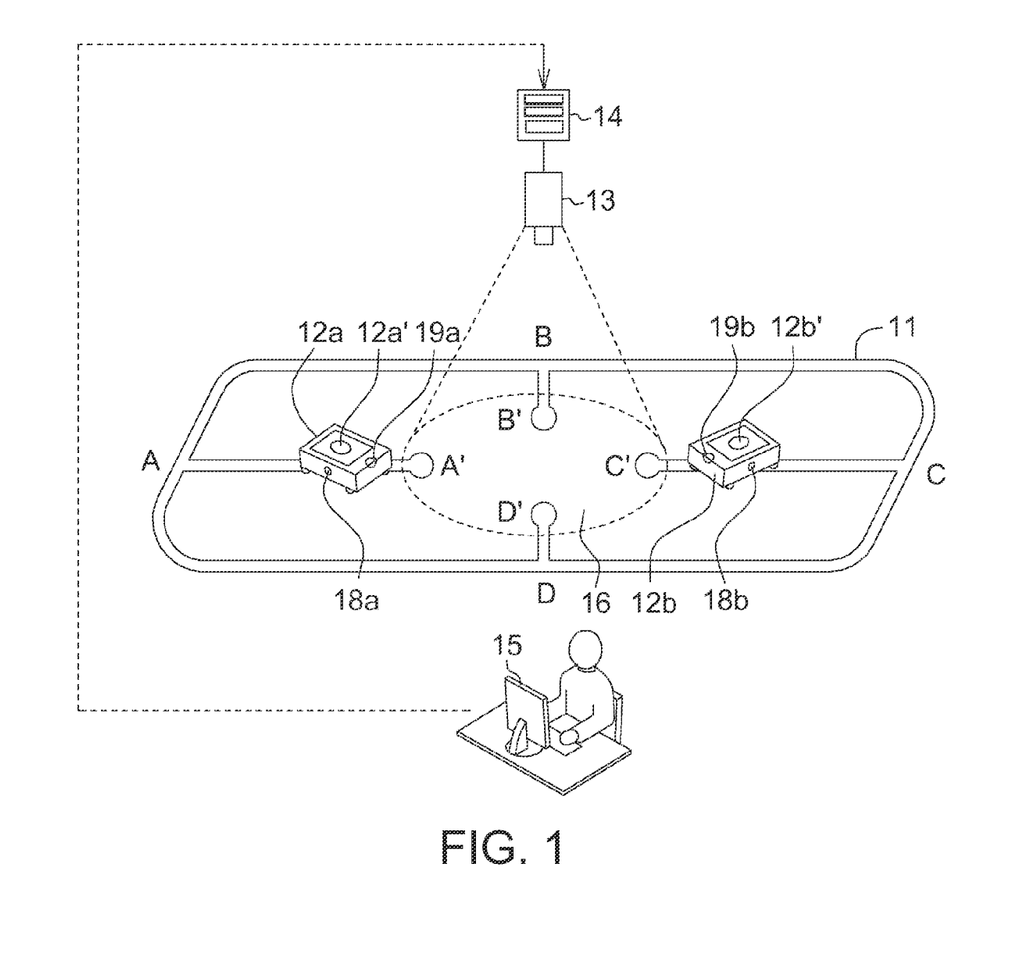
FIG. 1 is a schematic diagram of a system for guiding an AGV.
Figure 2:
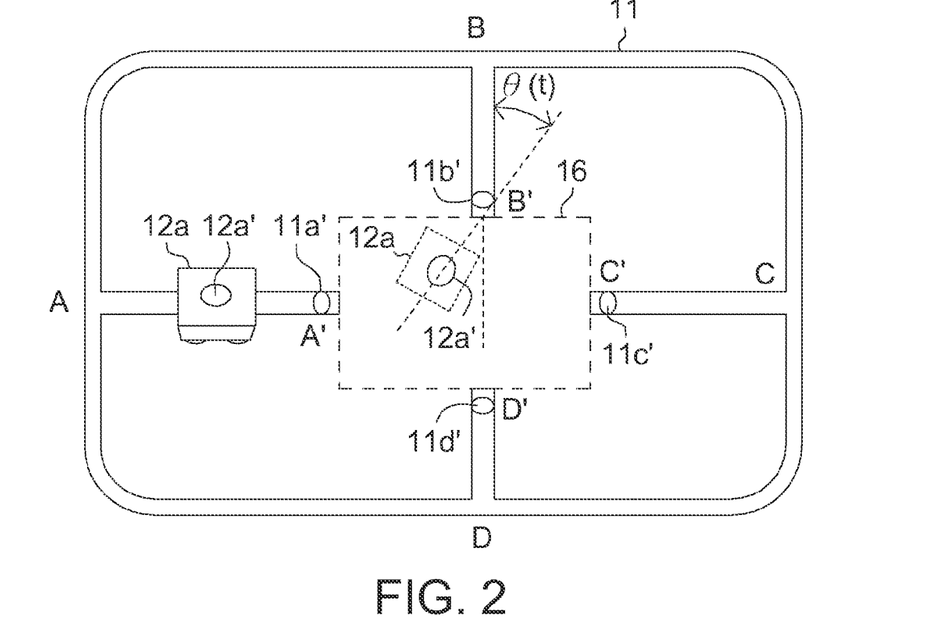
FIG. 2 is a top view of a vision guidance region.
Figure 3:
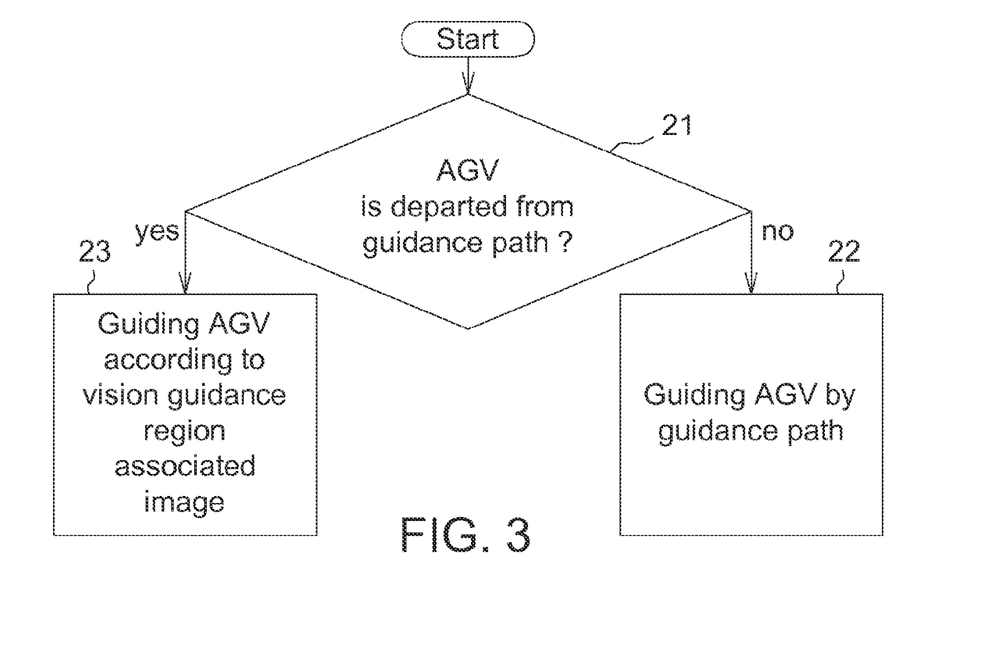
FIG. 3 is a flowchart of a guiding method for an AGV.

FIG. 1 shows a schematic diagram of a system for guiding an automated guided vehicle (AGV). FIG. 2 shows a top view of a vision guidance region. FIG. 3 shows a flowchart of a method for guiding an AGV. A system 1 for guiding an AGV (to be referred to as an AGV guiding system 1) includes a guidance path 11, an AGV 12a, an image capturing apparatus 13, an operation unit 14 and a control interface 15. The guidance path 11 guides the AGV 12a. For example, the guidance path 11 is a guidance line, a guidance tape, a guidance tag, a control tag, a rail, a magnetic stripe, a metal stripe, or color stripe. The AGV 12a is guided by the guidance path 11 to move on the guidance path 11, and moves in a vision guidance region 16 when departed from the guidance path 11. For example, the vision guidance region 16 is a non-rail region. The image capturing apparatus 13 captures a vision guidance region associated image. The vision guidance region associated image at least includes an image of the vision guidance region. The vision guidance region associated image may further include an image of a part of a neighboring rail or a terminal of the vision guidance region 16. The control interface 15 sets a task schedule or a destination position of the AGV 12a through the operation unit 14. A method for guiding an AGV is applicable to the AGV guiding system 1, and includes the following steps.

In Step 21, the operation unit 14 determines whether the AGV 12a is departed from the guidance path 11. When the AGV 12a is not departed from the guidance path 11, Step 22 is performed. In Step 22, the AGV 12a is guided by the guidance path 11. Conversely, when the AGV 12a is departed from the guidance path 11, Step 23 is performed. In Step 23, the operation unit 14 guides the AGV 12a according to the vision guidance region associated image.

The AGV 12a is taken as an illustrative example in the above description. The number of AGV can be adjusted according to actual application requirements. For example, the AGV guiding system 1 further includes an AGV 12b, which is guided in a similar manner as that of the AGV 12b. It should be noted that, when the AGVs 12a and 12b are departed from the guidance path 11 and enter the vision guidance region 16, the AGVs 12a and 12b are guided by the operation unit 14 according to the vision guidance region associated image. According to the vision guidance region associated image, the operation unit 14 appropriates performs route planning for the AGVs 12a and 12b in the vision guidance region 16 to prevent the AGVs 12a and 12b from crashing into each other.

Referring to FIG. 1, the AGV guiding system 1 further includes at least graphic tag 12a' and 12b', which are respectively disposed at the AGVs 12a and 12b. For example, the operation unit 14 identifies the identities and position information of the AGV 12a and the AGV 12b according to the graphic card 12a' and the graphic card 12b'. Alternatively, the operation unit 14 may also identify the AGV 12a and the AGV 12b according to the vision guidance region associated image and an image identification technique.

Again referring to FIG. 1, the guidance path 11 includes a branch AA', a branch BB', a branch CC' and a branch DD'. The branches AA', BB', CC' and DD' respectively include a terminal A', a terminal B', a terminal C' and a terminal D'. When the AGV 12a enters the vision guidance region 16 from the terminal A' and the destination position of the AGV 12a is the terminal B', the operation unit 14 performs routing planning for the AGV 12a in the vision guidance region 16 according to the vision guidance region associated image and the destination position until the AGV 12a reaches the terminal B' from the terminal A'.

With reference to FIGS. 1 and 2, the AGV guiding system 1 further includes tags 11a, 11b, 11c and 11d used to identify signal, tag readers 18a and 18b, and wireless communication modules 19a and 19b. For example, the tags 11a, 11b, 11c and 11 d are magnetic tags, radio-frequency identification (RFID) tags or vision tags, and the vision tags are bar-code tags or QR-code tags. For example, the tag readers 18a and 18b are magnetic tag readers, radio-frequency identification (RFID) tag readers or vision tag readers, and the vision tag readers are bar-code tag readers or QR-code tag readers. The wireless communication modules 19a and 19b are respectively disposed at the AGVs 12a and 12b. The AGVs 12a and 12b respectively transmit a signal to the operation unit 14 via the wireless communication modules 19a and 19b. The tag readers 18a and 18b, respectively disposed at the AGVs 12a and 12b, read the tag 11a', 11b', 11c' or 11d', which serves as a trigger for a mechanism of the operation unit 14 for guiding the AGVs 12a and 12b. The tags 11a', 11b', 11c' and 11d' are respectively disposed at the terminals A', B, C' and D'.

In the process of the guidance path 11 guiding the AGV 12a, when the tag reader 18a of the AGV 12a reads any of the tags 11a', 11b', 11c' and 11d', the AGV 12a transits a signal to operation unit 14 via the wireless communication module 19a, and the operation unit 14 accordingly determines whether the AGV 12a is departed from the guidance path 11. This operation is a signal notification of the department from the guidance path 11, and is for simultaneously activating a vision guidance region associate image guiding mode of the operation unit 14. When the operation unit 14 executes the vision guidance region associated image guiding mode, the AGV 12a is no longer guided by the guidance path 11.

Conversely, in the process of the operation unit 14 guiding the AGV 12a according to the vision guidance region associated image, when the tag reader 18a of the AGV 12a reads any of the tags 11a', 11b', 11c' and 11d', the AGV 12a transmits a signal to the operation unit 14 via the wireless communication module 19a. This operation is a signal notification of entering the guidance path, and is for simultaneously switching the guidance path 11 to guide the AGV 12a.

Similarly, in the process of the guidance path 11 guiding the AGV 12b, when the tag reader 18b of the AGV 12b reads any of the tags 11a', 11b', 11c' and 11d', the AGV 12b transits a signal to operation unit 14 via the wireless communication module 19b, and the operation unit 14 accordingly determines whether the AGV 12b is departed from the guidance path 11. This operation is a signal notification of the department from the guidance path 11, and is for simultaneously activating the vision guidance region associate image guiding mode of the operation unit 14. When the operation unit 14 executes the vision guidance region associated image guiding mode, the AGV 12b is no longer guided by the guidance path 11.

Conversely, in the process of the operation unit 14 guiding the AGV 12b according to the vision guidance region associated image, when the tag reader 18b of the AGV 12b reads any of the tags 11a', 11b', 11c' and 111d', the AGV 12b transmits a signal to the operation unit 14 via the wireless communication module 19b. This operation is a signal notification of entering the guidance path, and is for simultaneously switching the guidance path 11 to guide the AGV 12b.

It should be noted that the above approach for triggering the AGV 12a to depart from the guidance path 11 is not limited to utilizing the RFID technique. For example, photoelectric proximity switch, magnetic and mechanical triggered identification tags can be adopted. Further, the operation unit 14 may implement an image identification technique to determine whether the AGV 12a is departed from the guidance path 11. In one embodiment, the vision guidance region associated image only includes an image of the vision guidance region 16 but not an image of a part of a rail neighboring to the vision guidance region 16. Thus, when the vision guidance region associated image displays the AGV 12a, the operation unit 14 determines that the AGV 12a is departed from the guidance path 11 by identifying that the AGV 12a has entered the vision guidance region 16.

Route planning for the AGV 12a in the vision guidance region 16 may be implemented through several approaches, with some to be described shortly. For example, when the AGV 12a enters the vision guidance region 16 from the terminal A' to head for the terminal B' as the destination position, the operation unit 14 visually calculates relative position information of the AGV 12a and the terminal B', and visually calculates included angle information $\theta(t)$ between the AGV 12a and the branch BB' according to the vision guidance region associated image. The operation unit 14 then performs the route planning according to the relative position information and the included angle information $\theta(t)$. Since the image capturing apparatus 13 is capable of continuously capturing the vision guidance region associated image, the operation unit 14 is allowed to in real-time correct the relative position information and the included angle information $\theta(t)$ to appropriately perform the route planning.

Figure 4:
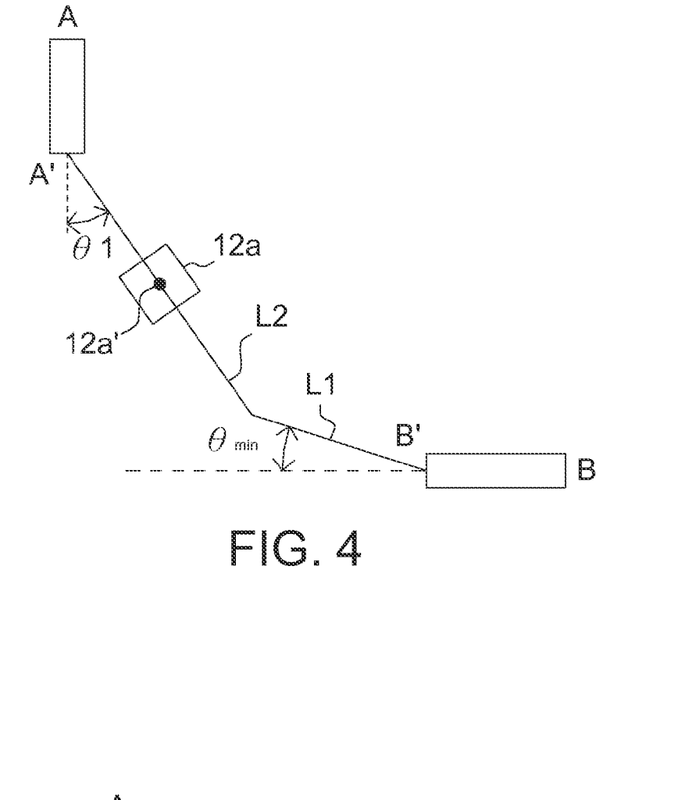
FIG. 4 is a schematic diagram of an operation unit performing route planning for a shortest path according to a minimum cut angle.

FIG. 4 shows a schematic diagram of an operation unit performing route planning for a shortest path according to a minimum cut angle. Apart from utilizing the relative position information and the included angle $\theta(t)$, the operation unit 14 also plans a shortest path in the vision guidance region 16 for the AGV 12a according to a minimum cut angle $\theta$min of the branch BB'. To prevent unexpected department of the AGV 12a when entering the branch BB', the AGV 12a may enter the branch BB' at a minimum cut angle $\theta$min when entering the branch BB'. The minimum cut angle $\theta$min varies according to capabilities of the AGV 12a. The AGV 12a moves towards an orientation angle $\theta$1 when leaving the branch BB'. The operation unit 14 finds a straight line L1 according to the minimum cut angle $\theta$min, and finds a straight line L2 intersecting the straight line L1 according to the terminal A' and the orientation angle $\theta$1. The operation unit 14 then performs route planning for a shortest path from the terminal A' to the terminal B' for the AGV 12a according to the straight lines L1 and L2.

Figure 5:
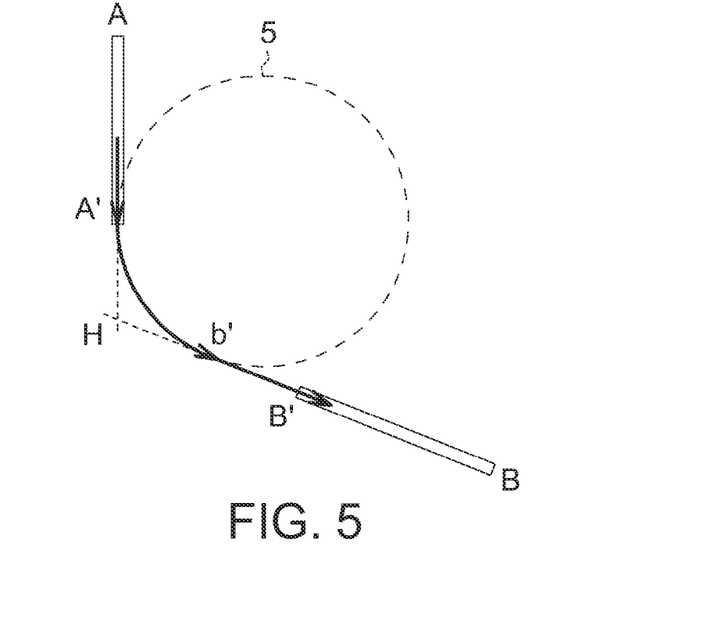
FIG. 5 is a schematic diagram of an operation unit performing route planning according to terminals and a circle.

FIG. 5 shows a schematic diagram of an operation unit performing route planning according to terminals and a circle. Referring to FIGS. 1, 3 and 5, apart from utilizing the minimum cut angle $\theta$1 for route planning, the operation unit 14 may also perform route planning according to the terminal A', the terminal B' and a circle 5. The operation unit 14 first calculates an intersection H of extension directions of the branch AA' and the branch BB'. A connecting line between the terminal A' and the intersection H is defined as a segment A'H, and a connecting line between the terminal B' and the intersection H is defined as a segment B'H. The operation unit 14 selects a shorter segment of the segments A'H and B'H, and utilizes a physical terminal of the shorter segment as a tangent point. In FIG. 5, the terminal A' is a passing point. The operation unit 14 finds extension directions of the branch AA' and the branch BB', and performs route planning for the AGV 12a in the vision guidance region 16 according to the terminal A', the terminal B', the tangent point b' and the circle 5. The operation unit 14 next finds the tangent point b' that is tangent to the segment B'H. Thus, as far as the route planning for the AGV 12a in the vision guidance region 16 is concerned, the AGV 12a moves to the tangent point b' along the circumference of the circle 5 after departing from the terminal A', and linearly moves to the terminal B' along the linear extension direction of the branch BB'. After entering the terminal B', the AGV 12a becomes again guided by the guidance path 11.

Figure 6:
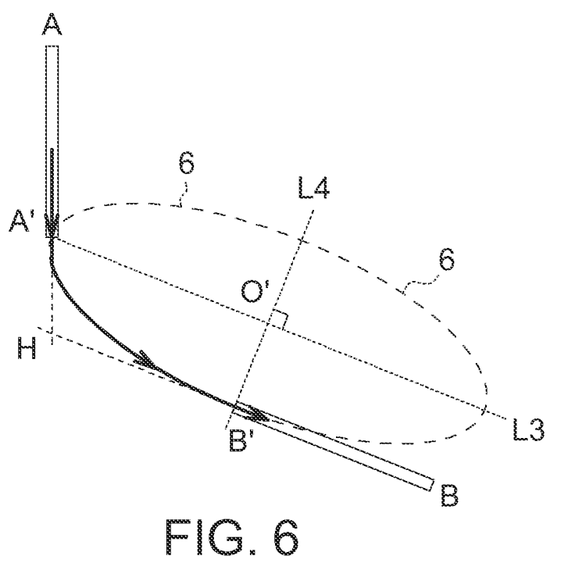
FIG. 6 is a schematic diagram of an operation unit performing route planning according to terminals and an ellipsoid.

FIG. 6 shows a schematic diagram of an operation unit performing route planning according to terminals and an ellipsoid. Referring to FIGS. 1, 3 and 6, apart from performing route planning according to the terminal A', the terminal B' and the circle 5, the operation unit 14 may also perform route planning according to the terminal A', the terminal B' and an ellipsoid 6. The operation unit 14 first calculates an intersection H of extension directions of the branch AA' and the branch BB'. A connecting line between the terminal A' and the intersection H is defined as a segment A'H, and a connecting line between the terminal B' and the intersection H is defined as a segment B'H. The operation unit 14 finds a straight line L3 that is parallel to the branch BB' and passes through the terminal A', and finds a straight line L4 that is perpendicular to the straight line L3 and passes through the terminal B'. The straight lines L3 and L4 intersect at an ellipsoid center O'. In this embodiment, the segment B'H is a longer of the segments A'H and B'H. Regarding a distance between the terminal A' to the ellipsoid center O' and a distance between the terminal B' and the ellipsoid center O' as ellipsoidal radius, the operation unit 14 determines the ellipsoid 6. Thus, the operation unit 14 performs route planning for the AGV 12a in the vision guidance region 16 according to the terminal A', the terminal B' and the ellipsoid 6. Therefore, as far as the route planning for the AGV 12a in the vision guidance region 16 is concerned, the AGV 12a moves to the terminal B' along the circumference of the ellipsoid 6 after departing from the terminal A'. After entering the terminal B', the AGV 12a becomes again guided by the guidance path 11.

Figure 7:
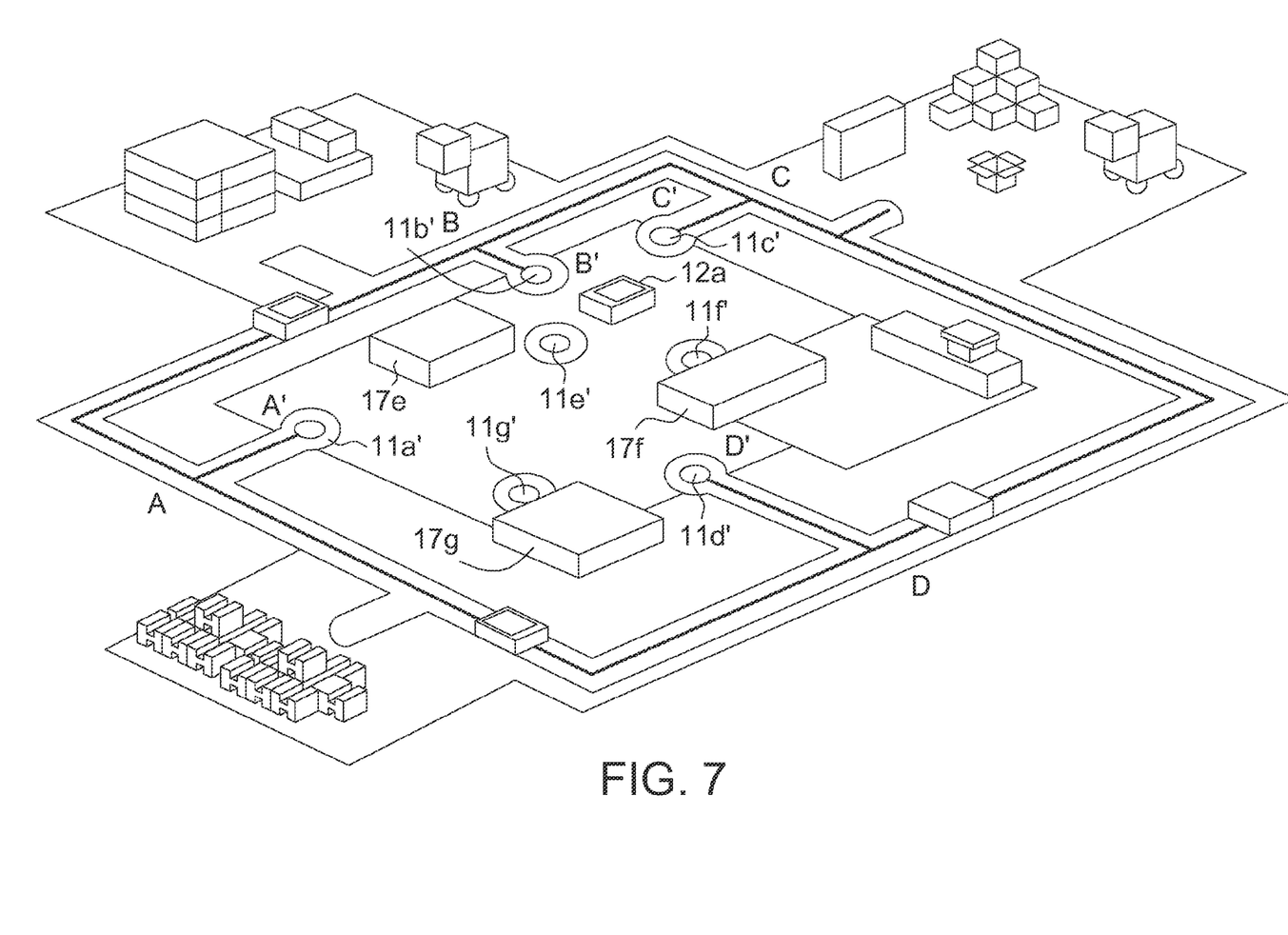
FIG. 7 is a schematic diagram of tags being disposed in a neighboring manner at work stations.

FIG. 7 shows a schematic diagram of tags being disposed in a neighboring manner at work stations. Referring to FIGS. 1, 3 and 7, the foregoing AGV guiding system 1 may further include tags 11e', 11f' and 11g' such as RFID tags. The tags 11e', 11f' and 11g' are respectively disposed at in a neighboring manner at work stations 17e, 17f and 17g. According to the vision guidance region associated image as well as the tags 11e', 11f' and 11g', the operation unit 14 guides the AGV 12a to move from the terminal A' through the work stations 17e, 17f and 17g to arrive the terminal B'.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for guiding an automated guided vehicle (AGV), comprising:
    a guidance path, for guiding the AGV; wherein the AGV moves on the guidance path when the AGV is on the guidance path;
    an image capturing apparatus, for capturing a vision guidance region associated image at least comprising an image of the vision guidance region; and
    an operation unit, for determining whether the AGV is departed from the guidance path, and guiding the AGV according to the vision guidance region associated image when the AGV is departed from the guidance path;
    wherein the guidance path comprises a first branch and a second branch, the first branch comprises a first terminal, and the second branch comprises a second terminal, and the vision guidance region is a non-guidance-path region between the first terminal and the second terminal; when the AGV departs from the first terminal of the guidance path and enters the vision guidance region, the AGV is guided by the operation unit rather than the guidance path until the AGV arrives at the second terminal, the operation unit guides the AGV according to the vision guidance region associated image when the AGV enters the vision guidance region.

2. The system according to claim 1, further comprising:
    a first tag used to identify signal, disposed at the first terminal;
    a second tag used to identify signal, disposed at the second terminal;
    an tag reader, disposed at the AGV, for reading the first tag or the second tag as a trigger for a mechanism of the operation unit for guiding the AGV.

3. The system according to claim 1, further comprising:
    a wireless communication module, disposed at the AGV, for informing the operation unit to determine whether the AGV is departed from the guidance path when the AGV reads the first tag or the second tag.

4. The system according to claim 1, wherein the vision guidance region associated image is the image of the vision guidance region, and operation unit determines that the AGV is departed from the guidance path when the vision guidance region associated image displays the AGV.

5. The system according to claim 1, wherein the operation unit visually calculates relative position information of the AGV and the second terminal according to the vision guidance region associated image, visually calculates included angle information between the AGV and the second branch according to the vision guidance region associated image, and performs route planning according to the relative information and the included angle information.

6. The system according to claim 1, wherein the operation unit performs route planning for a shortest path in the vision guidance region for the AGV according to a minimum cut angle of the second branch.

7. The system according to claim 1, wherein the operation unit calculates an intersection of extension directions of the first branch and the second branch, a connecting line between the first terminal and the intersection is defined as a first segment and a connecting line between the second terminal and the intersection is defined as a second segment; the operation unit selects a shorter segment of the first and second segments and utilizes a physical terminal of the shorter segment as a passing point; the operation unit finds a circle that is tangent to extension directions of the first branch and the second branch according to the passing point, with the circle being tangent to the extension direction of the second branch at a tangent point; the operation unit performs route planning for the AGV in the vision guidance region according to the first terminal, the tangent point, the second terminal and the circle.

8. The system according to claim 1, wherein the operation unit calculates an intersection of extension directions of the first branch and the second branch, a connecting line between the first terminal and the intersection is defined as a first segment and a connecting line between the second terminal and the intersection is defined as a second segment; the operation unit finds a first straight line that is parallel to the to the first branch and passes through the first terminal, and finds a second straight line that is perpendicular to the first straight line and passes through the second terminal, and the first and second straight lines intersect at an ellipsoid center; the operation unit determines an ellipsoid by regarding a distance between the first terminal to the ellipsoid center and a distance between the second terminal and the ellipsoid center as ellipsoidal radiuses; and the operation unit performs route planning for the AGV in the vision guidance region according to the first terminal, the second terminal and the ellipsoid.

9. The system according to claim 1, further comprising:
a control interface, for setting a task schedule or a destination position of the AGV through the operation unit.

10. The system according to claim 1, further comprising:
a plurality of tags, respectively disposed in a neighboring manner at a plurality of work stations;
wherein, the operation unit guides the AGV to move from the first terminal through the work stations to arrive the second terminal according to the vision guidance region associated image and the tags.

11. A method for guiding an AGV, the AGV being guided and moving on a guidance path when the AGV being on the guidance path, and departing from the guidance path to move in a vision guidance region, the method comprising:
capturing a vision guidance region associated image at least comprising an image of the vision guidance region;
determining whether the AGV is departed from the guidance path;
guiding the AGV by the guidance path according to the guidance path when the AGV is not departed form the guidance path; and
guiding the AGV according to the vision guidance region associated image when the AGV is departed from the guidance path;
wherein the guidance path comprises a first branch and a second branch, the first branch comprises a first terminal, and the second branch comprises a second terminal, and the vision guidance region is a non-guidance-path region between the first terminal and the second terminal; when the AGV departs from the first terminal of the guidance path and enters the vision guidance region the AGV is guided by the operation unit rather than the guidance path until the AGV arrives at the second terminal, the operation unit guides the AGV according to the vision guidance region associated image when the AGV enters the vision guidance region.

12. The method according to claim 11, wherein the a first tag used to identify signal is disposed at the first terminal, a second tag used to identify signal is disposed at the second terminal, and a tag reader is disposed at the AGV and is for reading the first tag or the second tag as a trigger for a mechanism for guiding the AGV according to the vision guidance region associated image.

13. The method according to claim 11, wherein when the AGV reads the first tag or the second tag, a communication module informs an operation unit, and the operation unit determines whether the AGV is departed from the guidance path.

14. The method according to claim 11, wherein the vision guidance region associated image is the image of the vision guidance region, and the AGV is determined as being departed from the guidance path when the vision guidance region associated image displays the AGV.

15. The method according to claim 11, wherein the step of guiding the AGV according to the vision guidance region associated image visually calculates relative position information of the AGV and the second terminal according to the vision guidance region associated image, visually calculates included angle information between the AGV and the second branch according to the vision guidance region associated image, and performs route planning by the operation unit according to the relative information and the included angle information.

16. The method according to claim 11, wherein the step of guiding the AGV according to the vision guidance region associated image performs route planning for a shortest path in the vision guidance region for the AGV according to a minimum cut angle of the second branch.

17. The method according to claim 11, wherein the step of guiding the AGV according to the vision guidance region associated image comprises:
calculating an intersection of extension directions of the first branch and the second branch; wherein a connecting line between the first terminal and the intersection is defined as a first segment and a connecting line between the second terminal and the intersection is defined as a second segment;
selecting a shorter segment of the first and second segments and utilizing a physical terminal of the shorter segment as a passing point;
finding a circle that is tangent to extension directions of the first branch and the second branch according to the passing point, with the circle being tangent to the extension direction of the second branch at a tangent point; and
performing route planning for the AGV in the vision guidance region according to the first terminal, the tangent point, the second terminal and the circle.

18. The method according to claim 11, wherein the step of guiding the AGV according to the vision guidance region associated image comprises:
calculating an intersection of extension directions of the first branch and the second branch; wherein a connecting line between the first terminal and the intersection is defined as a first segment and a connecting line between the second terminal and the intersection is defined as a second segment;
finding a first straight line that is parallel to the to the first branch and passes through the first terminal, and finding a second straight line that is perpendicular to the first straight line and passes through the second terminal; wherein the first and second straight lines intersect at an ellipsoid center;
determining an ellipsoid by regarding a distance between the first terminal to the ellipsoid center and a distance between the second terminal and the ellipsoid center as ellipsoidal radiuses; and
performing route planning for the AGV in the vision guidance region according to the first terminal, the second terminal and the ellipsoid.

19. The method according to claim 11, further comprising:
setting a task schedule or a destination position of the AGV.

20. The method according to claim 11, wherein a plurality of tags are respectively disposed in a neighboring manner at a plurality of work stations, and the step of guiding the AGV according to the vision guidance region associated image guides the AGV to move from the first terminal through the work stations to arrive the second terminal according to the vision guidance region associated image and the tags.

* * * * *